Patented June 17, 1930

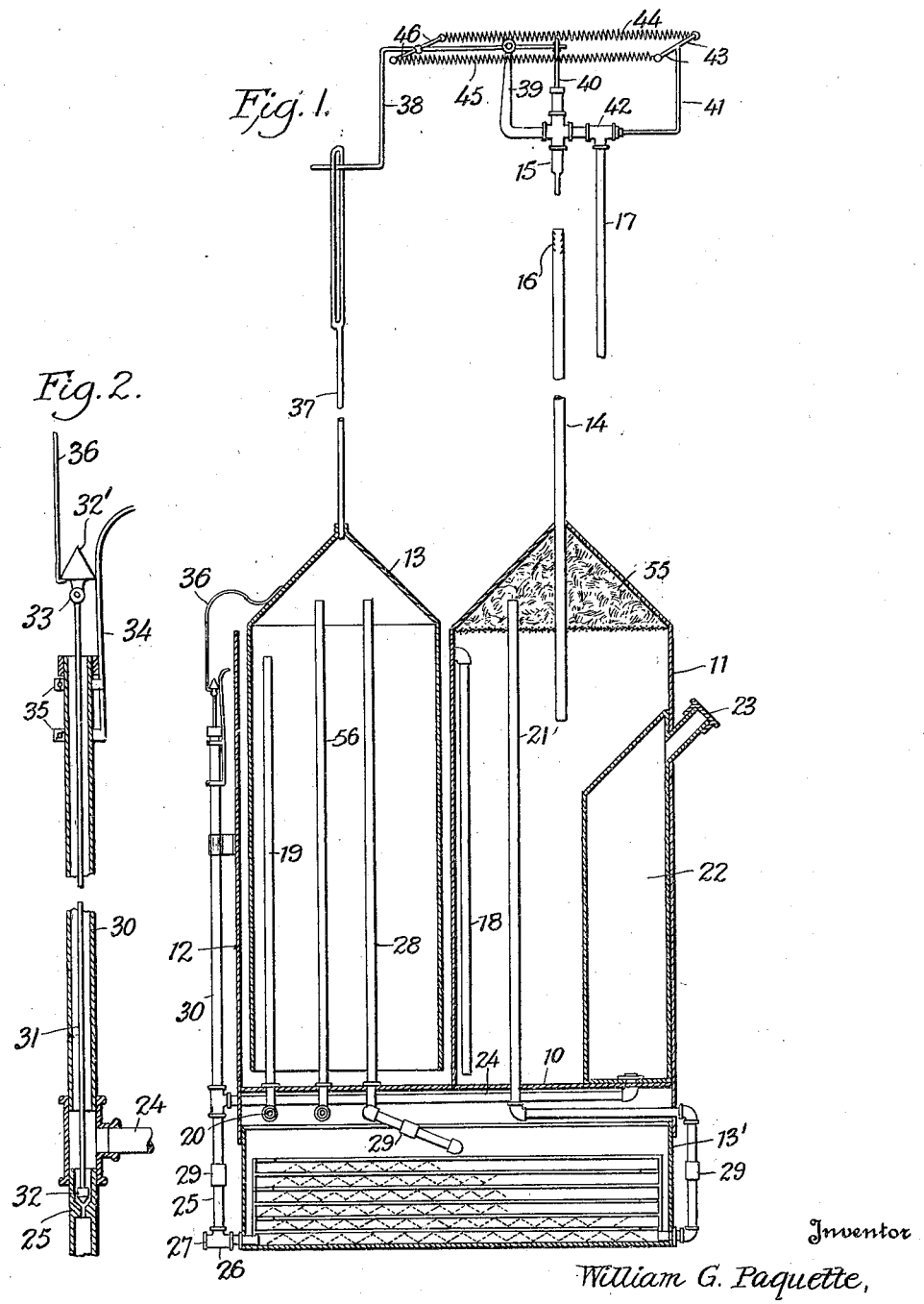

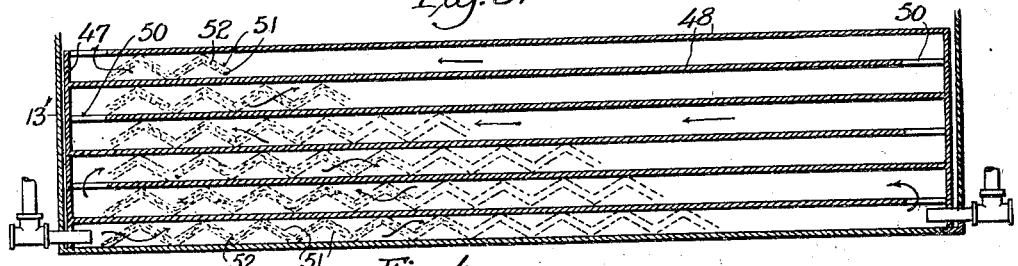
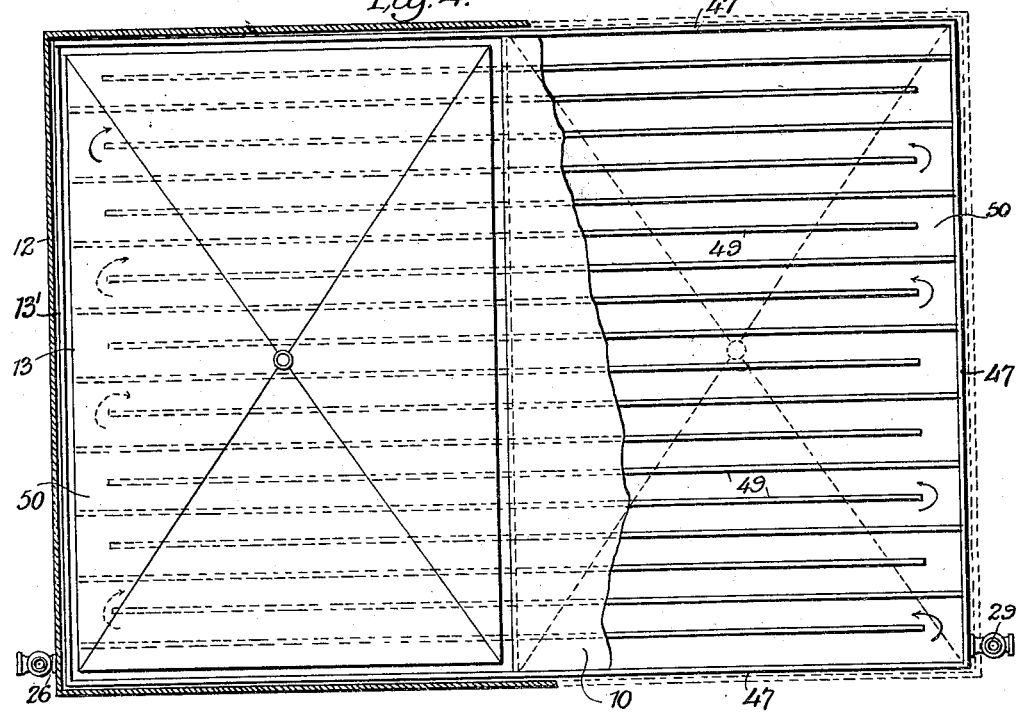
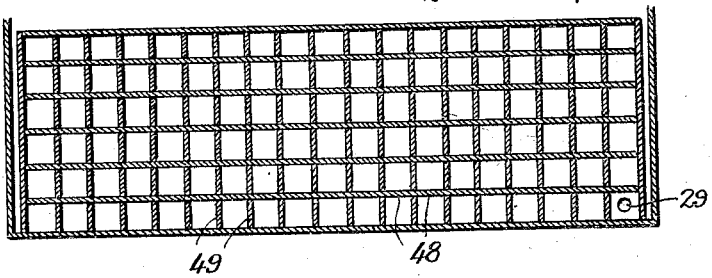

1,764,974

UNITED STATES PATENT OFFICE

WILLIAM G. PAQUETTE, OF ASHEVILLE, NORTH CAROLINA

GAS GENERATOR

Application filed March 5, 1929. Serial No. 344,394.

My said invention relates to a gas generator and it is an object thereof to provide a device of this character which is particularly suitable for domestic use in that it is very compact and does not require elaborate connections in order to fit it up for use in the home. The device is simple in construction and can be manufactured at a low cost. It is so made as to utilize ordinary gasoline or like fuel as a source of gaseous fuel together with water and air and is so made that the overflow of water can be used for any ordinary purpose, while the heavier part of the liquid fuel which is not readily vaporized at ordinary temperatures can readily be drawn off and used in an internal combustion engine. Customarily such portion of the liquid fuel is used with entire success in any ordinary automobile.

A further object of my invention is to provide automatic means for controlling the supply of liquid fuel in such a way that a considerable quantity will be made and stored thereby insuring uniform quality of the gaseous fuel.

Another object of the invention is to provide automatic water, air and fuel supplying means controlled by the quantity of gaseous fuel in such a way that a full charge of such fuel will be ready for use in a gas stove or other suitable appliance.

Another object of the invention is to provide means controlled by the quantity of stored gaseous fuel for setting the device in operation when the gaseous fuel in storage falls below a certain amount. It will be understood that such gaseous fuel may be used for cooking, heating, lighting, gas refrigeration, etc., and my controlling means will act equally well regardless of whether the rate of consumption is slow or rapid or intermittent to any extent that may be desirable.

Referring to the drawings, which are made a part of this application and in which similar reference characters indicate similar parts:

Fig. 1 is an elevation of my device, partly in section to illustrate the internal construction, Fig. 2, a detail of parts shown in Fig. 1, on a larger scale, Fig. 3, an elevation of a carbureter forming a part of my device, this also being on an enlarged scale, Fig. 4, a plan of said carbureter with parts broken away, and Fig. 5, an end elevation of the carbureter.

In the drawings reference character 10 indicates the bottom of a container which has a closed compartment 11 and another compartment 12 open at the top. The compartment 12 contains a bell 13 and below the floor 10 there is a carbureter having an outer casing 13′ fitting within the depending flange of the common outer wall of the containers 11 and 12.

A pipe 14 extends up through the top of the closed container 11, said pipe being open at both ends and a water outlet 15 is so positioned that when open it will permit water to flow in a jet under pressure into the upper end of the pipe 14 which is provided near its upper end with saw-cuts or other suitable openings, indicated at 16, so that air may be drawn into the pipe 14 by the flow of water, in addition to the air entering at the top of the pipe. A supply pipe 17 provides water for the water outlet. The compartment 11 communicates with the compartment 12 by means of a conduit 18 in the form of a pipe opening near the bottom of the compartment 11 so as to be sealed by the water in the compartment 11. A conduit 19 in the compartment 12 comprises a pipe extending up into the bell 13 and terminating at the desired water level in the compartment 12, said pipe at the lower end 20 leading to a suitable outlet for excess water. The pipe 14 extends to a point below water level in the two compartments to prevent back flow of gas from the carbureter hereinafter described. It will be seen that the bell 13 is sealed within the compartment 12.

A conduit 21 extends from a point near the top of the compartment 11 above the water level downward to the righthand end of the carbureter casing hereinafter described and provides a supply of moistened air for the carbureter. Within the compartment 11 there is positioned a gasoline tank 22 with a supply nozzle 23 extending outwardly through the wall of compartment 11 this being for compactness and also to reduce fire hazard, as the tank is preferably entirely surrounded by water except at the points of support and at the nozzle. This tank communicates by means of a conduit 24 with a pipe 25 leading to the lefthand end of the carbureter. The pipe 25 leads into a union 26 which may be closed at its outer end by a plug 27 through which unvaporized gasoline residue can be drawn off or a suitable spigot may be provided at this point. A conduit 28 leads upward from the top of the carbureter to the top of the bell 13 above the water level whereby gaseous fuel from the carbureter passes into the space under the bell. As a matter of convenience in assembling the device the pipe 25 and the portions of conduit 21 and 28 next to the carbureter are provided with unions indicated at 29.

A support 30 extends upward from the pipe 25, this support being here shown as a hollow piece of pipe or the like which forms a guide for the stem 31 of a valve 32 seating in a suitable valve seat within the pipe 25. This valve stem is provided at its upper end with a head 32' triangular in cross section and pivotally connected to the stem at 33 and the hollow support 30 also acts as a support for a curved guide 34 fastened to the same by clamping means indicated at 35. By loosening the clamps the guide may be adjusted upward or downward on support 30.

The bell has connected thereto at one side a resilient hook 36 bent at its lower end to engage under the triangular head 32 for raising the valve when the bell has moved upward to a distance corresponding to the distance between the under face of said head and the upper end of support 30, i. e., when the storage under the bell 13 has been filled with gaseous fuel to the extent indicated. The bell also carries an upwardly extending rod 37 slotted at its upper end to receive the free end of a bent lever 38 pivoted on a bracket 39 carried by the pipe 17 or attached to any suitable support. The other end of the bent lever has a lost motion connection to the stem 40 of the valve for the water supply. It is desired that there shall be a quick snappy action of this valve and for this purpose I have provided a fixed bracket 41 secured to a plug in a union 42 on pipe 17 or otherwise suitably mounted. At its upper end the bracket has two arms 43 extending in opposite directions to which arms over-center springs 44 and 45 are attached. These springs at their other ends beyond the pivot of lever 38 are attached to arms 46 on said lever and it will be seen that when the lever is urged in one direction or the other by rod 37 it will move slowly until the plane of the springs passes the pivot of the lever whereupon the lever will be suddenly moved to extreme position, carrying with it the valve for the water supply.

The carbureter consists of an outer casing 13' previously referred to, within which is a construction comprising end and side walls 47 supporting shelves or horizontal members 48 and upright members 49 which provide a tortuous passage for the moistened air and the vapor arising from the liquid fuel. It will be evident on consideration of Figs. 3 to 5 that the horizontal shelves extend substantially from side to side of the carbureter but either terminate alternately short of opposite ends of the same or in some other way have openings provided alternately at opposite ends as indicated at 50. In like manner the parts of the vertical members adjacent the ends of the walls either terminate short of the opposite walls at opposite ends of said members or else have suitable openings formed therein so that between each set of shelves a tortuous passage is provided from one side of the carbureter to the other and that the passage when it reaches the corner of the space between shelves farthest from the entrance opening passes thence upward to the space between the next higher pair of shelves. The cells or channels bounded by two adjacent shelves and by adjacent upright members contain a zigzag arrangement comprising two strips of wire screen 51 bent into a zigzag, with a strip of burlap 52 or like material between them.

Above the water level in the compartment 11 there is a partition 55 and the space above the partition is filled with excelsior or other absorbent material to condense the moisture in the air at this point and prevent the air passing down to the carbureter from being too wet.

In the operation of my device, the parts may be assumed to be in position in Fig. 1 for generating gas to fill the space under bell 13. A jet of water will now flow into pipe 14, carrying air with it into compartment 11, and liquid fuel will flow from tank 22 through pipes 24 and 25 (valve 32 being open) and through union 26 to the carbureter. Air is also forced into the carbureter by the pressure in compartment 11 and passes through the liquid fuel as indicated in Figs. 3, 4 and 5, carrying with it the volatile constituents of the liquid fuel. The carbureted air then passes through pipe 28 to the bell, which is gradually raised until rod 37 has been lifted high enough to tilt the lever 38 so far that the over-center springs 44 and 45 can snap the lever to position for closing valve 40 and cut off the water. At about the same time head 32' of valve 32 has been permitted by its guide 34 to fall over to the right and the valve 32 is then closed by gravity to stop the supply of fuel. Generation of gas now ceases until after sufficient gas has been used in a stove, gas-light or other fixture communicating with the bell by an outlet pipe 56, so that the bell has descended to a point where spring hook 36 has engaged under the head 32′ and the lever 38 has been tilted by rod 37 to permit the over-center springs 44 and 45 to open valve 40, when the water entering pipe 14 will create pressure in compartment 11 sufficient to be transmitted through pipe 21, carbureter 13′ and pipe 28 so as to raise the bell 13 enough to open valve 32 and permit liquid fuel to enter the carbureter, when the operation is repeated as above described.

Having thus fully described my said invention what I claim as new and desire to secure by Letters Patent is:

1. A gas generator comprising a stationary container having a closed compartment and a compartment open at the top, a pipe extending upward from the closed compartment, a water outlet positioned to direct a jet of water into the open end of said pipe, a valve for the water outlet, a conduit between the two compartments, means for limiting the depth of water in the second compartment, a liquid fuel tank in the first compartment, a carbureter secured to said container said carbureter being approximately equal in length and width to said container, a conduit for moistened air leading from the upper part of the closed compartment to one end of the carbureter, a conduit for liquid fuel leading from said tank to the other end of the carbureter, a valve in said conduit, means providing a tortuous path for fluid from the bottom to the top of said carbureter, a conduit leading from the top of the carbureter to a point above the water level in the open-topped compartment, a bell fitting in the last-named compartment for up and down movement, a rod extending upward from said bell, a lever having lost motion connection with said rod and the valve for the water outlet, means in connection with said lever for opening and closing said valve with a snap action, a triangular head pivotally connected to said valve for liquid fuel, a hook on the bell for lifting the valve, and a guide alongside said triangular head for holding it in engagement with the hook up to a predetermined height and then permitting disengagement of such parts.

2. In a gas generator, a unit consisting of a container having a closed compartment, an open-topped compartment, a liquid fuel tank in one of said compartments, and a carbureter in telescoping relation to the bottom of the container, in combination with means for supplying air and water to the closed container, means for supplying moistened air from the closed compartment to said carbureter, means for supplying liquid fuel from said tank to said carbureter, a bell closing the open-topped compartment, and a conduit extending from the carbureter to the space under the bell.

3. In a gas generator, a receiving compartment for gas, a bell in said compartment, means providing a water seal for the bell, a carbureter communicating with the space underneath the bell, means for supplying combustible liquid to the carbureter, and means controlled by the bell for controlling the flow of such liquid including a valve having a stem parallel to the bell, releasable connections between the valve and the bell for lifting the valve off its seat as the bell rises, and automatic means whereby release is effected at a predetermined time in the rise of the bell.

4. In a gas generator, a receiving compartment for gas, a bell in said compartment, means providing a water seal for the bell, a carbureter communicating with the space underneath the bell, means for supplying combustible liquid to the carbureter, and means controlled by the bell for controlling the flow of such liquid including a valve, a hook carried by the bell, a stem on the valve, a pivoted head on the stem, and a guide alongside the path of movement of the head said guide permitting the head to release itself from said hook at a predetermined point in the upward movement of the bell.

5. A device as in claim 4, said curved guide being supported for vertical adjustment to vary the time of release of said head.

6. In a gas generator, a receiving compartment for gas, a bell in said compartment, means providing a water seal for the bell, a carbureter communicating with the space underneath the bell, means for supplying combustible liquid to the carbureter, means controlled by the bell for controlling the flow of such liquid including a valve having movement in a direction parallel to the movement of the bell, releasable connections between the valve and the bell, automatic means whereby release is effected at a predetermined time in the rise of the bell, and automatic means for re-establishing the connection during descent of the bell.

7. In a gas generator, a closed compartment, an open-topped compartment, injecting means for supplying air and water to the closed compartment, a conduit between said compartments for maintaining a water seal for the bell, a carbureter communicating with the space under the bell, means for supplying moistened air from said closed compartment to the carbureter, and means operated by the position of the bell for controlling the operation of the injecting means.

8. A gas generator including a storage compartment, a bell therein, a water seal for the bell, a carburetor, air injecting and moistening means for the carburetor including an injector supplying water to the water seal and air to the carburetor, fuel-supplying means for the carburetor, means for controlling the supply of air and water, and other means for controlling the supply of fuel both said controlling means being operated by said bell.

In testimony whereof I affix my signature.

WILLIAM G. PAQUETTE.